United States Patent
Huan et al.

(10) Patent No.: US 9,853,577 B2
(45) Date of Patent: Dec. 26, 2017

(54) MULTI-FLAP STANDING WAVE TYPE ULTRASONIC MOTOR

(71) Applicant: Yijun Huan, Jingjiang, Jiangsu (CN)

(72) Inventors: Min Huan, Jingjiang (CN); Zhendong Tang, Jianjiang (CN); Yuanxing Tang, Jianjiang (CN); Honglin Lu, Jingjiang (CN); Tong Lu, Jingjiang (CN)

(73) Assignee: Yijun Huan, Jingjiang (CN)

( * ) Notice: Subject to any disclaimer, the term of this patent is extended or adjusted under 35 U.S.C. 154(b) by 606 days.

(21) Appl. No.: 14/465,385

(22) Filed: Aug. 21, 2014

(65) Prior Publication Data

US 2016/0020711 A1      Jan. 21, 2016

(30) Foreign Application Priority Data

Jul. 18, 2014   (CN) .......................... 2014 1 0343127

(51) Int. Cl.
| | |
|---|---|
| *H02N 2/02* | (2006.01) |
| *H02N 2/10* | (2006.01) |
| *H02N 2/00* | (2006.01) |
| *H02N 2/14* | (2006.01) |

(52) U.S. Cl.
CPC ............. *H02N 2/103* (2013.01); *H02N 2/002* (2013.01); *H02N 2/142* (2013.01)

(58) Field of Classification Search
CPC .......... H02N 2/103; H02N 2/142; H02N 2/10; H02N 2/12

USPC ........................................ 310/323.01–323.21
See application file for complete search history.

(56) References Cited

U.S. PATENT DOCUMENTS

| | | | | |
|---|---|---|---|---|
| 2005/0012433 | A1* | 1/2005 | Brady ................... | H02N 2/002 310/323.08 |
| 2009/0121586 | A1* | 5/2009 | Kesil ...................... | H02N 2/002 310/323.02 |

* cited by examiner

*Primary Examiner* — Derek Rosenau
(74) *Attorney, Agent, or Firm* — Oliff PLC

(57) ABSTRACT

Provided is a multi-flap standing wave type ultrasonic motor, including a rotor part, a stator part, a control circuit board, and a fixing attachment. The rotor part includes a flange, a rotor ring, and a shaft. The shaft and the flange are joined together by using a first screw and the flange and the rotor ring are joined together by using a second screw. The stator part includes a piezoelectric ceramics, an excitation ring, and flaps. The piezoelectric ceramics and the excitation ring are fixed with glue, the flaps and the excitation ring are connected through welding, and form an angle with the radial direction of the excitation ring. The stator part is sleeved on a support, is attached to a pressure plate and is connected, through an upright, to a locking plate, and to a substrate of the control circuit board to form a fixing attachment. The flaps are an elastomer and a preload provider. The inner diameter of the rotor ring is less than the outer diameter of the flaps. Adopted is a circular-distributed flap structure, an outer rotor design, an integrated design of motor and control, and a sensor, thereby simplifying the system structure. By adopting circular-distributed assembled flaps, the processing difficulty of the flaps is reduced.

1 Claim, 3 Drawing Sheets

MULTI-FLAP STANDING WAVE TYPE ULTRASONIC MOTOR

BACKGROUND

Technical Field

The present invention relates to an ultrasonic motor, and in particular, to a multi-flap standing wave type ultrasonic motor.

Related Art

Ultrasonic motors are motors with a new drive principle, and compared with conventional electromagnetic motors, ultrasonic motors do not use coils, and employ the inverse piezoelectric effect of piezoelectric ceramic and friction coupling between a stator and a rotor to achieve energy conversion from electrical energy to torque output of the motor. Compared with the electromagnetic motor, the ultrasonic motor has the characteristics of fast response, high torque at low speed, self-locking upon no input, and electromagnetic interference free. The current standing wave ultrasonic motor has an inner-rotor flap structure, but the inner rotor structure has a complex process, the processing precision of parts cannot be ensured in batch production, enough power cannot be generated, and the inner rotor structure cannot be applied.

The stator of the current ultrasonic motor employs an integrated multi-flap structure, so that the structure is complex and is difficult to process.

SUMMARY

An objective of the present invention is to provide a multi-flap standing wave type ultrasonic motor, which adopts a circular-distributed flap structure, an outer rotor design, an integrated design of motor and control, and uses a sensor, thereby simplifying the system structure.

The problems to be solved by the present invention are implemented through the following technical solutions: the present invention includes a rotor part, a stator part, a control circuit board and a fixing attachment. The rotor part includes a flange, a rotor ring and a shaft, where the shaft and the flange are joined together by using a first screw and the flange and the rotor ring are joined together by using a second screw. The stator part includes a piezoelectric ceramics, an excitation ring, and flaps, where the piezoelectric ceramics and the excitation ring are fixed with glue, the flaps and the excitation ring are connected through welding, and form an angle with a radial direction of the excitation ring, the stator part is sleeved on a support, is attached to a pressure plate and is connected, through an upright, to a locking plate, and to a substrate of the control circuit board to form a fixing attachment, and the flap is an elastomer and a preload provider.

The inner diameter of the rotor ring is less than the outer diameter of the flaps, and the flaps are made of an elastic sheet material, and are in linear contact with the inner surface of the rotor, so that the flaps are bent to form the preload. The flaps form an angle with the radial direction of the excitation ring, and form elliptical particles after excitation so as to promote the rotor to move in the inclined direction of the flaps.

The motor has an outer diameter of Φ20 to Φ35, a height of 10 mm to 15 mm, a speed of 6 r/min to 100 r/min, and a torque of 0.2 Nm to 0.4 Nm. Although the stator flaps contact with a part of the rotor, because multiple flaps contact with the rotor at the same time, and the outer diameter of the flaps is greater than the inner diameter of the rotor, applied preload can be generated after assembly, while the friction loss is not increased, and the noise is not increased. The stator flaps are fixed in the axial direction rather than the radial direction, so that the transfer loss of the vibration energy is less, thereby achieving the characteristic of large torque at low speed at the same volume.

Compared with a common standing wave motor, the structure of the present invention is short and flat, it is convenient to fix the motor on the circuit board, and the motor can be connected with other loads through the circuit board without affecting the performance and accuracy of the motor.

An objective of the present invention is further to provide assembled flaps for an ultrasonic motor, so as to reduce the processing difficulty of the flap by adopting circular-distributed assembled flaps.

The present invention uses No. 20 steel and 65Mn steel as the processing materials, which are joined together through processing and welding, and form an angle with the axis during welding, so that elliptical vibration of the vertex is converted into the thrust on the rotor.

The present invention includes an excitation ring, flaps, and a solder, where the excitation ring is processed into a ring shape, and the inner hole size is in transition fit with the piezoelectric ceramics. A slot forming an angle with the axis is opened on the outer circumference, the width of the slot is 0.10 mm to 0.25 mm, and the thickness of the flaps is in correspondence with the width of the slot. The flaps are made of an elastic sheet material such as 65Mn, and the flaps are inserted into the slot of the excitation ring, and joined together through welding. The flaps are made of an elastic sheet material and form a preload on the surface of the rotor, form an angle with the radial direction of the excitation ring, and form elliptical particles after excitation so as to promote the rotor to move in the inclined direction of the flaps.

Such a structure can be processed by a common lathe or miller, and the processing efficiency is high. Because the flaps are assembled, the processing difficulty is reduced, and the processing precision of the flaps are improved.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
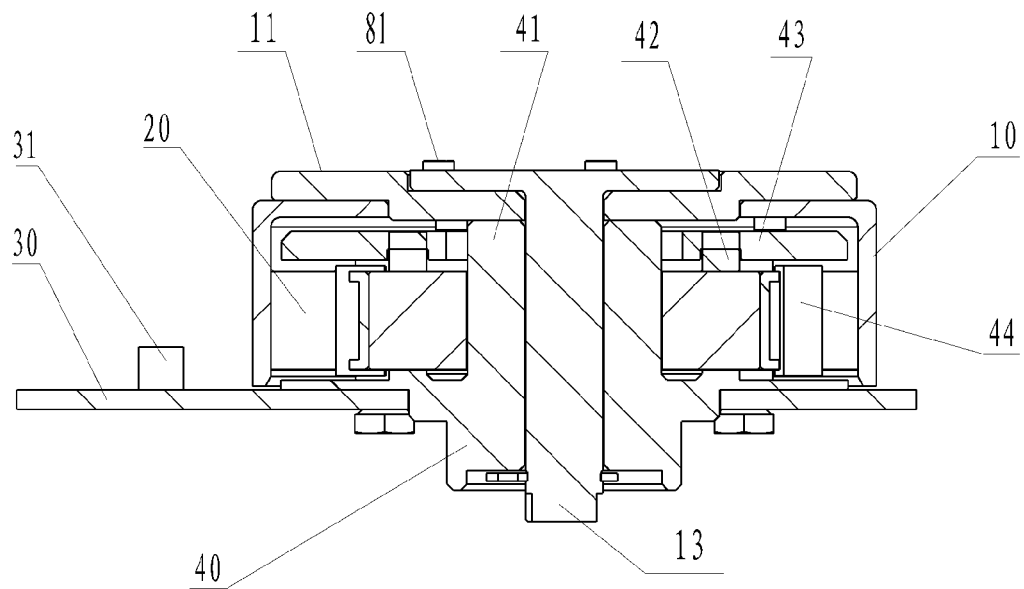
FIG. 1 is a schematic structural diagram of a multi-flap standing wave type ultrasonic motor.
Figure 2:
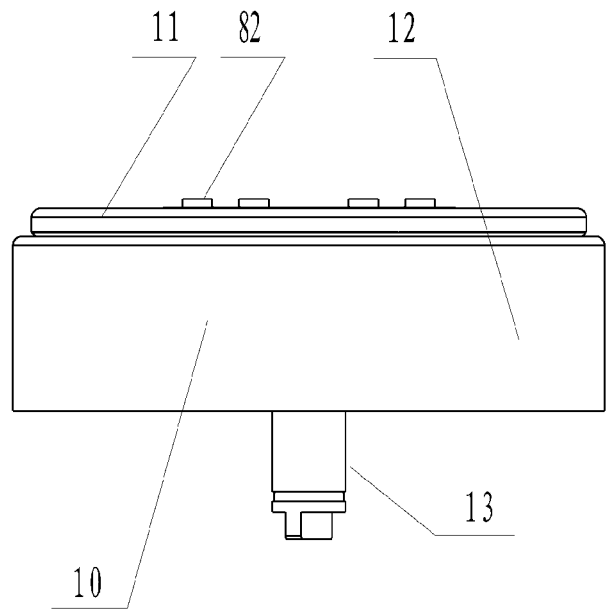
FIG. 2 is a schematic diagram of a rotor part of a multi-flap standing wave type ultrasonic motor.
Figure 3:
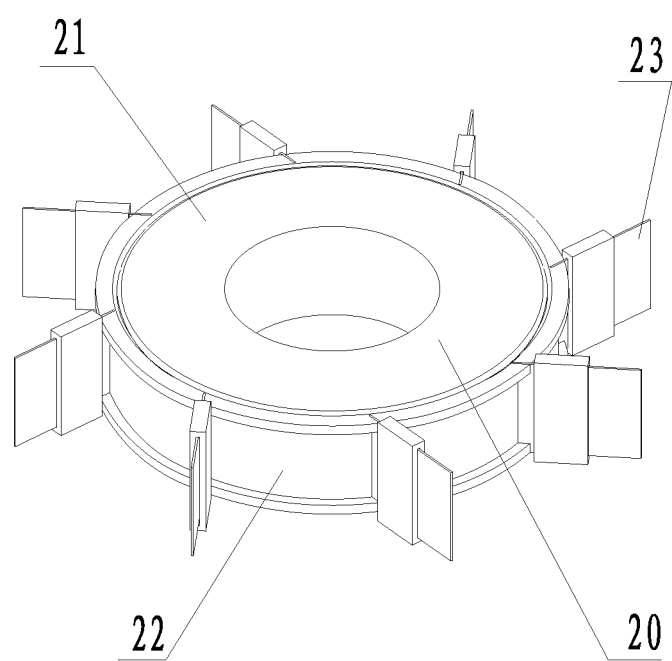
FIG. 3 is a schematic diagram of a stator part of a multi-flap standing wave type ultrasonic motor.

As shown in FIG. 1 to FIG. 3, a multi-flap standing wave type ultrasonic motor of the present invention includes a rotor part 10, a stator part 20, a control circuit board 30 and a fixing attachment 40. As shown in FIG. 2, the rotor part 10 includes a flange 11, a rotor ring 12 and a shaft 13, where the shaft 13 and the flange 11 are joined together by using a screw 81 and the flange 11 and the rotor ring 12 are joined together by using a screw 82. As shown in FIG. 3, the stator part 20 includes a piezoelectric ceramics 21, an excitation ring 22 and flaps 23, where the piezoelectric ceramics 21 and the excitation ring 22 are fixed with glue, and the flaps 23 and the excitation ring 22 are connected through welding, and form an angle with the radial direction of the excitation ring. As shown in FIG. 1, the stator part 20 is sleeved on a support 41, is attached to a pressure plate 42 and is connected, through an upright 44, to a locking plate 43, and to a substrate of the control circuit board to form the fixing attachment 40, and the flap 23 is an elastomer and a preload provider. The inner diameter of the rotor ring 12 is less than the outer diameter of the flaps 23. The shaft has no bearing thereon, and performs sliding friction in the inner hole of the support, the surface of the flange fits the upper surface of the support, and the rotor is fixed in the axial direction on the other surface of the support through an external retaining ring for shaft on the shaft.

The flaps 23 are made of an elastic sheet material, form the preload on the surface of the rotor, and form an angle with the radial direction of the excitation ring so as to promote the rotor to move in the inclined direction of the flaps.

A photoelectric sensor 31 is installed in the circuit, so as to determine the rotational angle of the rotor by detecting the outer circle of the rotor, thereby achieving precise operation.

Figure 4:
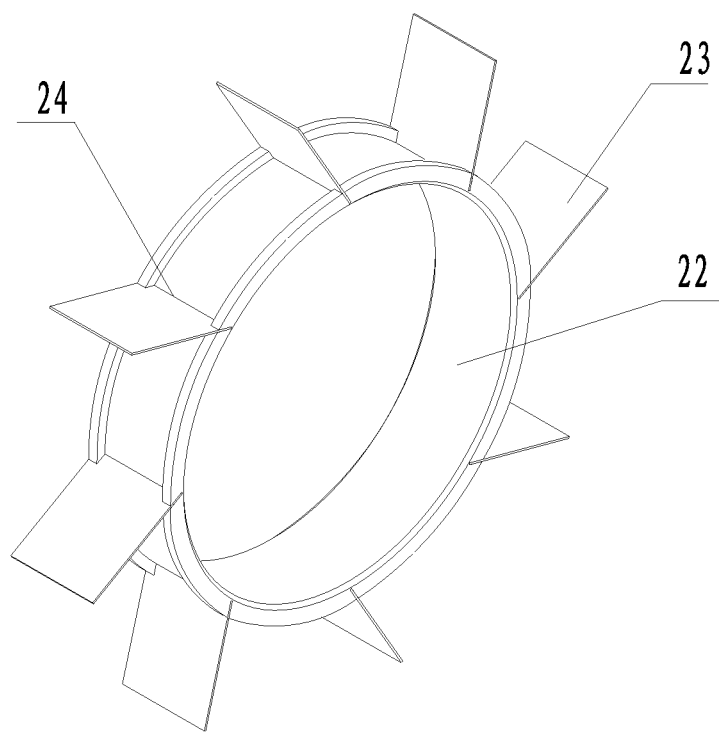
FIG. 4 is a schematic structural diagram of assembled flaps for a multi-flap standing wave type ultrasonic motor.

It can be known from FIG. 4 that, the flaps of the present invention include the excitation ring 22, flaps 23 and a solder 24. The excitation ring 22 is processed into a ring shape. A slot forming an angle with the radial direction of the excitation ring is opened on the outer circumference of the excitation ring 22, the width of the slot is 0.10 mm to 0.25 mm, and the thickness of the flaps 23 is in correspondence with the width of the slot. The excitation ring 22 and the flaps 23 are made of an elastic sheet material such as 65Mn, and the flaps 23 are inserted into the slot of the excitation ring 22 and joined together through welding with the solder 24.

The excitation ring 22 and the flaps 23 are made of an elastic sheet material and form a preload on the surface of the rotor, form an angle with the radial direction of the excitation ring, and form elliptical particles after excitation so as to promote the rotor to move in the inclined direction of the flaps.

What is claimed is:

1. A multi-flap standing wave type ultrasonic motor, comprising a rotor part, a stator part, a control circuit board and a fixing attachment, wherein the rotor part comprises a flange, a rotor ring and a shaft, the shaft and the flange are joined together by using a first screw and the flange and the rotor ring are joined together by using a second screw, the stator part comprises a piezoelectric ceramics, an excitation ring and flaps, the piezoelectric ceramics and the excitation ring are glued together, and the stator part is sleeved on a support, is attached to a pressure plate and is connected, through an upright, to a locking plate and to a substrate of the control circuit board, an inner diameter of the rotor ring is less than an outer diameter of the flaps, each flap comprises a solder, is inserted into a slot of the excitation ring, is joined together with the excitation ring through welding with the solder, and forms an angle with an radial direction of the excitation ring, a slot forming an angle with a radial direction of the excitation ring is opened on an outer circumference of the excitation ring, a width of the slot is 0.10 mm to 0.25 mm, and a thickness of the each of the flaps is in correspondence with the width of the slot, the excitation ring and the flaps are made of an elastic sheet material, and a photoelectric sensor is installed in a circuit of the control circuit board, so as to determine an operating angle of the rotor by detecting an outer circle of the rotor.

\* \* \* \* \*